July 6, 1954  L. J. WARD  2,682,773
GYROSCOPE
Filed Aug. 21, 1951
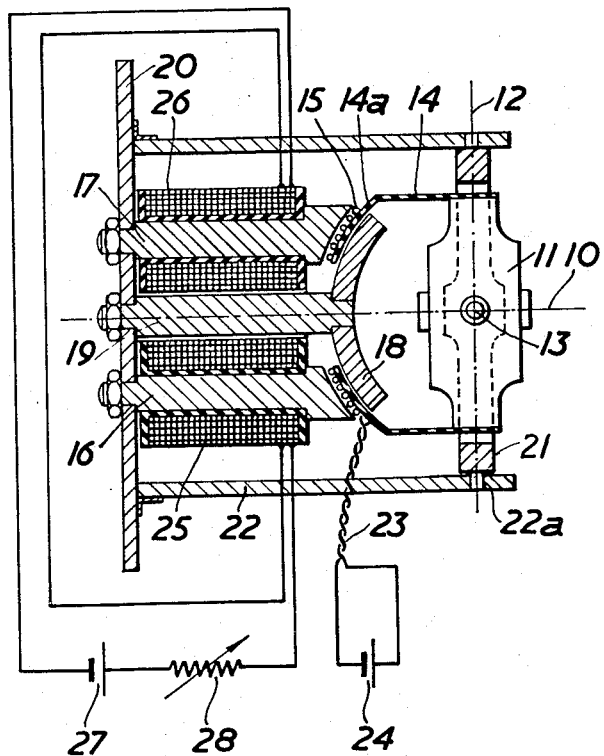
Inventor:
Leslie J. Ward
By Babcock + Babcock
Attorneys

Patented July 6, 1954

2,682,773

UNITED STATES PATENT OFFICE

2,682,773

GYROSCOPE

Leslie Joseph Ward, Letchworth, England, assignor to The English Electric Company Limited, London, England, a British company Application August 21, 1951, Serial No. 242,817

Claims priority, application Great Britain
August 28, 1950

2 Claims. (Cl. 74—5.4)

This invention relates to means for giving precessional motion to gyroscopes.

A gyroscope according to the invention is supported so that it can pivot about two axes which are mutually perpendicular and both perpendicular to the normal spin axis, has a current-carrying coil fixed co-axially relative to the gyroscope spin bearings and arranged to pass through air gaps of a plurality of magnetic circuits, and is provided with means to vary the fluxes in the air gaps and thereby to apply precessing torques to the gyroscope.

The accompanying drawing shows diagrammatically a sectional view taken on the normal spin axis of a gyroscope which is provided with apparatus embodying the invention in preferred form.

The centre line 10 is the normal spin axis of a gyroscope. The stator 11 of this gyroscope carries spin bearings. The rotor of the gyroscope is not shown, but is contained within the stator 11 which is not sectioned in the figure.

Gyroscope stator 11 is pivotally supported about an axis 13 perpendicular to the plane of the figure by bearings in a gimbal ring 21. This gimbal ring 21 is itself pivotally supported about an axis 12 in the plane of the figure by bearings 22a in frame plates 22.

A spinning having a tubular part 14 and an apertured dome part 14a is secured to the stator 11 of the gyroscope. On the outside of the dome part 14a of this spinning a coil of conductor wire 15 is secured co-axially with spin axis 10. A flexible conductor 23 supplies this coil 15 with a steady direct current from a source indicated at 24.

The coil 15 is situated in the air gaps of four magnetic circuits each having an individual pole, two of which are shown at 16 and 17, and all sharing a return path from part-spherical pole piece 18 and centre pole 19 to yoke 20 which serves as baseplate and is secured to frame plates 22. The remaining poles are situated in front of and behind the plane of the figure so that all of the four poles are symmetrically placed around axis 10.

Poles 16 and 17 are surrounded by exciting coils 25, 26, respectively, and these are connected in series with each other to a source of variable current diagrammatically represented by battery 27 in series with a variable resistor 28. These coils are so connected as to magnetise poles 16, 17, in opposite senses, and an increase in the currents through these coils will therefore produce forces, acting upon the parts of coil 15 within the air gaps of these poles, both producing torque upon member 14 in the same sense about axis 13.

The other two poles and their exciting coils, none of which are seen in the figure, are similarly connected to a variable source of current to provide a torque upon member 14 about axis 12.

By appropriate combination of variations of the exciting currents on the two pairs of poles, any required precessional torques may be applied through member 14 to the stator 11 of the gyroscope.

What I claim as my invention and desire to secure by Letters Patent is:

1. A gyroscope having its stator supported pivotally about two mutually perpendicular axes, both perpendicular to the normal spin axis, a plurality of ferromagnetic circuits having air gaps all lying substantially in a spherical surface having its centre at the intersection of said mutually perpendicular axes, magnetizing coils linking each of said ferromagnetic circuits, a direct current source connected to pass direct currents through said magnetizing coils, a conductor coil fixed to the gyroscope stator and arranged to pass through said air gaps and to link proportions of the magnetic fluxes thereacross dependent upon the precessional attitude of said stator relative to said axes, a direct current source connected to pass direct current through said conductor coil, and means to vary the strengths of the direct currents in said magnetizing coils to vary the relative values of the magnetic fluxes in said air gaps and thereby to apply precessing torques to the gyroscope stator.

2. A gyroscope having its stator supported pivotally about two mutually perpendicular axes, both perpendicular to the normal spin axis, a plurality of ferromagnetic circuits having air gaps all lying substantially in a spherical surface having its centre at the intersection of said mutually perpendicular axes, magnetizing coils linking each of said ferromagnetic circuits, a direct current source connected to pass direct currents through said magnetizing coils, a part-spherical support of sheet material fixed to the gyroscope stator and arranged to pass through said air gaps, a conductor coil mounted on said support and arranged to link proportions of the magnetic fluxes across said air gaps dependent upon the precessional attitude of said stator relative to said axes, a direct current source connected to pass direct current through said conductor coil, and means to vary the strengths of the direct currents in said magnetizing coils to vary the relative values of the magnetic fluxes in said air gaps and thereby to apply precessing torques to the gyroscope stator.

References Cited in the file of this patent

UNITED STATES PATENTS

| Number | Name | Date |
|---|---|---|
| 1,613,301 | Umetsu | Jan. 4, 1927 |
| 1,679,354 | Fairchild et al. | Aug. 7, 1928 |
| 1,988,458 | Minorsky | Jan. 22, 1935 |
| 2,252,338 | Alkan | Aug. 12, 1941 |
| 2,274,443 | Fischer | Feb. 24, 1942 |
| 2,527,245 | Cunningham et al. | Oct. 24, 1950 |